Feb. 13, 1934.　　　A. REIMERS　　　1,947,060
COLLET CHUCK
Filed June 1, 1931
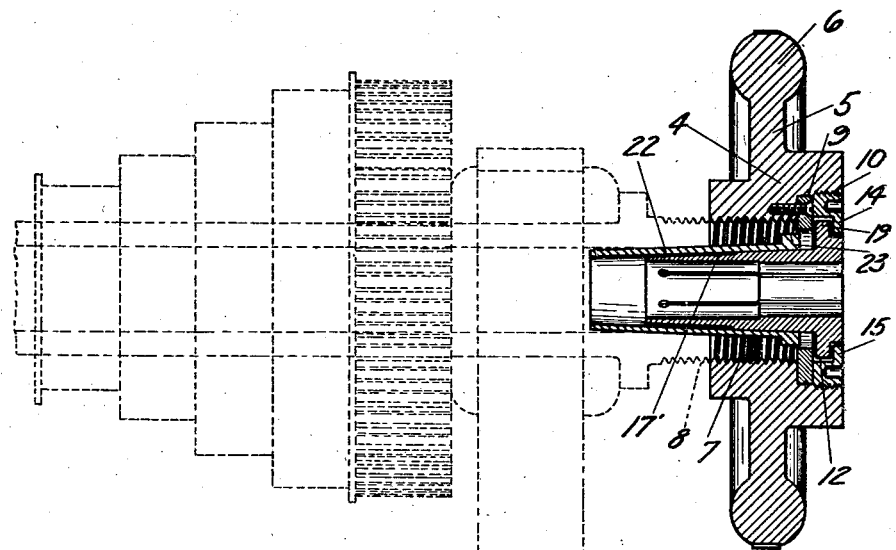
FIG-1
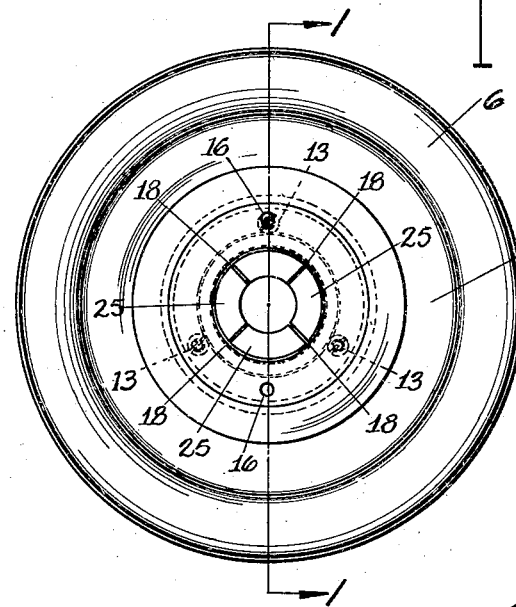
FIG-2
FIG-3
A. REIMERS INVENTOR.
BY Merrill M. Blackburn.
ATTORNEY.

Patented Feb. 13, 1934

1,947,060

UNITED STATES PATENT OFFICE 1,947,060

COLLET CHUCK

Anton Reimers, Davenport, Iowa

Application June 1, 1931. Serial No. 541,340

4 Claims. (Cl. 279—49)

My present invention relates to chucks, and more particularly to a chuck for forcing a collet into and out of position in a mandrel or other rotatable spindle in a lathe or similar machine tool.

It is a purpose of my invention to provide a device of the above mentioned character, which is adapted to be engaged with a screw-threaded hollow spindle, to move a tapered expansible and contractible member into and out of engagement with the opening in said spindle, said chuck being so constructed that the adjustment thereof to clamp the tapered expansible and contractible member in the opening and to disengage the same therefrom can be accomplished with ease and without the use of any detachable handles, keys, or other adjusting members which, if left in position, would project so as to be dangerous to the operator of the machine upon rotation of the spindle.

It is a further purpose of my invention to provide a chuck of the above mentioned character which has no gears or other movable parts for adjusting the same on the mandrel, the adjustment being accomplished by a simple screw-threaded connection, and to provide a chuck that is adapted to receive the collet therein detachably, in such a manner that the collet interfits with the chuck so that movement of the chuck in one direction will force the collet into clamping position, and in the opposite direction will force the collet out of clamping position, said means being so constructed that rotation of the collet and the chuck relative to each other can take place during adjustment of the device. Preferably, the chuck is provided with a detachable ring and an inwardly flanged detachable collar providing spaced abutments, between which a rib on the collet is mounted to provide the connection whereby this movement in opposite directions of the collet is accomplished. It is another purpose of my invention to provide means directly on the body thereof for rotating the chuck, said means being fixed in position on said body and, preferably, integral therewith, and comprising, in the embodiment shown, a hand wheel formed on the periphery of the chuck.

Other objects and advantages of my invention will appear as the description of the drawing proceeds. I desire to have it understood, however, that I do not intend to limit myself to the particular details shown and described except as defined in the claims.

In the drawing annexed hereto and forming a part hereof,

Fig. 1 is a transverse sectional view through my improved chuck and collet, showing a portion of a lathe, in dotted lines, with which the same is ordinarily associated, the section being taken substantially on the line 1—1 of Fig. 2;

Fig. 2 is a view of the outer face of the chuck and collet;

Fig. 3 is a view similar to Fig. 1 showing my improved chuck and collet, such as may be used when the intermediate sleeve between the hollow spindle and the collet is omitted.

Referring in detail to the drawing, my improved chuck comprises a body portion 4, having an outwardly extending annular web portion 5 on the periphery thereof terminating in a rounded annular rim portion 6 whereby the body portion of said chuck constitutes the hub portion of a hand wheel, of which the annular portion 6 is the rim. Said body portion 4 is provided with an axial opening therethrough, having an internally threaded portion 7 of such a size that the same will fit the externally threaded portion 8 of a hollow spindle on a machine tool, such as the rotatable hollow spindle shown in Fig. 1 of the drawing, in dotted outline, the structure shown in dotted outline being a portion of a well known type of lathe.

The opening in the chuck further comprises a portion of larger diameter than the threaded portion 7, said portion of larger diameter having a smooth cylindrical wall portion 9 and an internally threaded wall portion 10, a shoulder perpendicular to the wall portion 9 being defined at 11 in said opening due to the difference in diameter of the two portions thereof.

Fitting within the unthreaded wall portion 9, slidably, is an annular abutment member or bearing ring 12, the ring 12 being of hard steel and secured against the abutment 11 in fixed position by any suitable securing means, such as the screws 13, having the heads thereof countersunk in the ring 12. The internal diameter of the ring 12 is considerably smaller than the diameter of the internally threaded portion 7 of the opening through the chuck and constitutes an annular abutment within the opening through the chuck.

Engaging with the threaded portion 10 of the opening through the chuck are the external threads on the flanged ring 14, which has the inwardly directed annular flange 15 on the outer side thereof, whereby said flange 15 is spaced from the ring 12, the internal diameter of the flange 15 being substantially the same as the internal diameter of the ring 12, said flange 15 thus forming an abutment spaced from the abutment formed by said ring 12. The flange 14 is provided with a plurality of openings 16 for engagement of a suitable tool therewith for rotating the same. It will be seen that the ring 12 and the flanged ring 14 provide detachable spaced abutment members within the axial opening through the chuck.

The chuck described above is used in connection with a collet or similar expansible and contractible member which is actuated to grip a member to be worked on, such as a piece of stock, by longitudinal movement thereof relative to a threaded hollow spindle or similar member that is provided with a circular opening therein, or for moving lengthwise of such a threaded member any other means that is to be forced axially in either direction relative to said member. The preferred use, however, is with a collet such as the collet 17 that is expansible and contractible due to the provision of the usual slots 18 therein, and which has an annular rib or similar enlargement 19 thereon, adapted to be mounted in the groove between the abutments formed by the rings 12 and 14.

The collet 17, shown in Fig. 3, is formed with a pair of annular faces on opposite sides of the annular rib 19, which have sufficient clearance from the ring 12 and the flange 15 to permit rotation of the chuck relative to the collet, which latter is spaced far enough from the inner face of the ring 14 to permit centering of the collet relative to the spindle.

Where merely the collet 17 is used, the same is forced into the opening 20 in the hollow threaded member 8, and the tapered outer face of the collet 17 engaging with the wall of the opening 20 causes the inward wedging of the spaced resilient jaw 25 formed on the collet by means of the slots 18 to grip a member mounted in the opening 21 in the collet. Such movement of the collet relative to the threaded member 8 is obtained by rotation of the handwheel-like chuck in such a direction as to advance the same upon the threaded member 8, whereupon the flange 14 engages with the annular rib 19 to force the collet inwardly. In order to facilitate the withdrawal of the work from the collet and disengagement of the collet from the member 8, the body portion of the chuck is rotated on the threaded member 8 in the opposite direction, causing the ring 12 to engage the rib 19 to draw the collet outwardly, permitting the same to expand and disengage the member held thereby.

In order to increase the wedging action and to adapt the collet for use in a member which is of a somewhat larger bore relative to the size of the collet than that shown in Fig. 3, or to adapt the device for the holding of smaller tools or work, a tapered sleeve-like member 22 may be provided, which is interposed between the threaded member 8, which has the bore therein, and the collet. The collet 17', shown in Fig. 1, is shorter than the collet 17, though that is not essential, and has the body thereof cut away up to the base of the rib 19 so as to accommodate the sleeve 22, and permit the annular flange 23 thereon to be forced into position closely adjacent said rib 19, in adjusting the collet within the sleeve 22.

In either case, in order to assemble the collet with the chuck, the ring 14 is unscrewed and the collet is inserted in the axial opening in the chuck and moved into position with the rib 19 thereon in engagement with the ring 12, whereupon the flanged ring 14 is screwed into position until the same is drawn down against the ring 12, confining the collet in position in the chuck, though permitting it to have enough freedom of movement to adjust itself within the spindle when the chuck is tightened up.

It will be seen from the above that a very simple, strong and efficient chuck is provided which can be utilized to move a collet or similar member, that has to be moved lengthwise of a threaded member, to be moved into or out of operative position, with the exertion of a relatively small amount of effort, due to the provision of the handwheel portion 6 on said chuck, that this chuck comprises no parts that have to be moved to obtain such adjustment, and which ordinarily require means projecting from the chuck, which has to be removed to avoid danger to the operator from projecting moving parts while the chuck is rotating when in use on a machine, such as a lathe.

Having now described my invention, I claim:

1. The combination with a hollow threaded member, of a chuck having a body portion with an opening therethrough threaded to engage with said member so as to move lengthwise along the same upon rotation of said chuck relative to said member, said body portion having a recess in the end face thereof surrounding said opening and constituting an enlargement thereof facing outwardly away from said member, means in said recess providing an abutment projecting into said opening, and a flanged collar detachably mounted in said recess to provide an abutment spaced from said first mentioned abutment.

2. The combination with a hollow threaded member, of a chuck having a body portion with an opening therethrough threaded to engage with said member so as to move lengthwise along the same upon rotation of said chuck relative to said member, said opening having an enlargement providing a shoulder therein, an annular member mounted in said opening in engagement with said shoulder and projecting inwardly beyond the shoulder to provide an abutment, and a flanged collar detachably mounted in said chuck engaging said annular member with the flange thereon spaced from said abutment.

3. A chuck of the character described, comprising a body portion having a handwheel formed on the periphery thereof and having an axial opening extending therethrough, said opening having portions of different diameters providing a shoulder within said opening, the portion of lesser diameter being internally threaded and the portion of greater diameter having a threaded and an unthreaded portion, said unthreaded portion being adjacent said shoulder, a ring fitting said unthreaded portion and secured to said shoulder, said ring projecting inwardly to form an annular abutment in said opening, and a collar having threads thereon engaging the threads in said portion of greater diameter and having an inwardly extending flange thereon adjacent the outer end thereof providing an abutment in said opening spaced from said first abutment.

4. The combination of a hollow threaded spindle, of a chuck having a body portion with an opening therethrough threaded to engage with said spindle so as to move lengthwise along the same upon rotation of said chuck relative to said spindle, and a pair of detachable members in said chuck each providing an inwardly projecting abutment in said chuck, said abutments being spaced longitudinally of said chuck, one of said members being a ring-like member engaging a shoulder in said opening and projecting inwardly beyond said shoulder, and the other of said members comprising a collar having an inwardly directed flange thereon, said detachable members being removable from the chuck while the latter is in place upon the spindle.

ANTON REIMERS.